United States Patent [19]
Hickok et al.

[11] Patent Number: 4,928,196
[45] Date of Patent: May 22, 1990

[54] MAGNETIC RECORDING DEVICE USING CIRCUMFERENTIALLY OFFSET HEADS WITH DOUBLE SIDED MEDIA

[75] Inventors: William K. Hickok; John M. Riley, both of Rochester; Gerald J. Kosarko, Pavilion, all of N.Y.

[73] Assignee: Eastman Kodak Company, Rochester, N.Y.

[21] Appl. No.: 176,964

[22] Filed: Apr. 4, 1988

[51] Int. Cl.$^5$ .......................... G11B 5/50; G11B 21/16; G11B 17/32
[52] U.S. Cl. .................................. 360/105; 360/102; 360/104
[58] Field of Search ............... 360/102, 103, 104, 105, 360/106

[56] References Cited

U.S. PATENT DOCUMENTS

| | | | |
|---|---|---|---|
| 3,732,362 | 5/1973 | Kinjo | 360/10.1 |
| 3,946,439 | 3/1976 | Castrodale et al. | 360/105 |
| 4,003,091 | 1/1977 | Wright | 360/102 |
| 4,151,573 | 4/1979 | Tandon et al. | 360/104 |
| 4,320,426 | 3/1982 | Thompson | 360/104 |
| 4,537,509 | 8/1985 | Kronfeld | 360/109 |
| 4,578,727 | 3/1986 | Hills | 360/102 |
| 4,620,250 | 10/1986 | Hills | 360/102 |
| 4,703,375 | 10/1987 | Chan et al. | 360/105 |
| 4,709,285 | 11/1987 | Enami et al. | 360/104 |
| 4,792,874 | 12/1988 | MacDonald et al. | 360/102 |

FOREIGN PATENT DOCUMENTS

| | | | |
|---|---|---|---|
| 214597 | 3/1987 | European Pat. Off. | 360/104 |
| 52-73709 | 6/1977 | Japan | 360/104 |
| 59-54071 | 3/1984 | Japan | 360/104 |
| 1481370 | 7/1977 | United Kingdom | |

OTHER PUBLICATIONS

King et al., "Head Compliance System for Flexible Magnetic Disk," IBM TDB, vol. 18, No. 12, May 1976, pp. 4112–4114.

Primary Examiner—John H. Wolff
Attorney, Agent, or Firm—David M. Woods

[57] ABSTRACT

A pair of oppositely-disposed stabilizer devices support opposed magnetic heads for interfacing with opposite sides of a rotating magnetic disk. Each stabilizer device includes a block with an opening through which the magnetic head protrudes for engagement with a respective side of the disk. A flat, circumferential air bearing surface on each block surrounds the opening adjacent the disk for generating coupling forces that deform the disk out of its nominal plane on opposite sides thereof and into intimate contact with the transducing gaps on the respective heads. The stabilizer devices are positioned in relation to separate radii depending from the center of the drive spindle so that a circumferential offset is established that permits substantially separate interaction of the air bearing surfaces with the disk.

16 Claims, 5 Drawing Sheets

MAGNETIC RECORDING DEVICE USING CIRCUMFERENTIALLY OFFSET HEADS WITH DOUBLE SIDED MEDIA

BACKGROUND OF THE INVENTION

1. Field of the Invention

The invention generally relates to recording and/or reproducing apparatus for use with a flexible storage medium, such as a pliable magnetic disk, and, more particularly, to a double-sided recording device having magnetic heads disposed on opposite sides of the disk.

2. Description Relative to the Prior Art

U.S. Pat. No. 4,578,727 discloses a single-sided contact recording device that achieves a stable, constant interface between a moving disk and a magnetic head without the necessity of backing the disk with a pressure member. Such a stable interface is established by surrounding the transducing surface of the magnetic head with a small, flat air bearing surface. The head is supported in an opening in the air bearing surface to a negative pressure cavity. When the disk is rotated at relatively high speeds, a negative pressure is formed in the cavity that pulls a nearby section of the rotated disk into contact with the transducing surface of the head, thereby ensuring a constant interface for effective magnetic coupling. In companion U.S. Pat. No. 4,620,250, the air bearing surface is disposed at an angle with respect to the disk so that a leading edge of the air bearing surface penetrates slightly into the nominal plane of the rotating disk. This is believed to assist in the formation of strong coupling forces along the air bearing surface.

The air bearing surface has been further refined both as to shape and composition in U.S. patent application Ser. Nos. 19,468 and 136,793 (filed respectively on Feb. 26, 1987 and Dec. 22, 1987, and both assigned to the assignee of the present invention). The stabilizer described in the above patents is improved by establishing an abrupt transition in the leading edge of the air bearing surface that penetrates the nominal plane of the moving disk. The transition appears to act as a fulcrum, generating a force that turns a section of the moving disk about the transition and flattens the disk down upon the head. This force contributes to the coupling forces seen in the prior devices. The stabilizer is further improved if made from a ceramic material, such as barium titanate. A stabilizer of such material is operative for long periods with relatively low frictional drag between the disk and the air bearing surface, a condition that lowers current draw upon the disk drive motor. To date, such stabilizer devices as described in these patents and applications have not been disclosed for use in double-sided recording applications.

Double-sided recording on a floppy disk has been used to increase capacity and facilitate data transfer operations. As with most single-sided recording, pressure is required on the opposing side to urge the disk against the head. A typical double-sided contact system is disclosed by U.S. Pat. No. 4,151,573, which shows a fixed head on one side of a disk and a cantilevered, gimbal-mounted, movable head on the other side. In operation, the disk is confined against the fixed head, despite perturbations in movement of the disk, by the pressure of the movable head. Typically, the disk is contained within a protective plastic jacket. A shutter on the jacket is moved aside to reveal a windowed opening through which the heads can contact the disk. For double-sided recording, inasmuch as the window is quite small, the heads are ordinarily in direct opposition or slightly offset in a radial direction to avoid flux interaction. This arrangement is desirable in any case because the disk, according to the prior art, is urged against one head by the force of the other—as further illustrated by U.S. Pat. No. 4,320,426, in which the disk is conformed to a wavy contour where it is captured between two radially offset heads. Such teaching, however, does not encourage the successful juxtaposition of a pair of un-backed air bearing surfaces (as described in U.S. Pat. Nos. 4,578,727 and 4,620,250) because the opposed surfaces are intolerant of such close interaction.

SUMMARY OF THE INVENTION

In a general sense, a double-sided recording device according to the invention permits a circumferential offset between a pair of operating transducers so that they separately interact with the medium, instead of mutually interacting to their common detriment. This is accomplished by supporting the pair of transducers on a pair of carriage members, which in turn are commonly supported for radial movement relative to the axis of rotation of the medium. The transducers are disposed on opposite sides of the medium in relation to separate radii thereof such that a circumferential offset is maintained between the transducers. At least one of the carriage members is acted upon for relatively urging the transducers toward each other to cause each transducer to separately interact with the medium.

More particularly, the invention can be viewed in terms of the peculiarities of associating two un-backed air bearing surfaces with opposite sides of a magnetic disk. The air bearing surfaces are formed on a pair of stabilizing members, each including a negative pressure cavity in which a head is supported. Each cavity has an opening to the disk surface for generating a pull down force on successive portions of the rotated disk as each portion is moved over the opening. The stabilizing members are disposed on opposite sides of the disk in relation to separate radii thereof such that a circumferential offset is maintained between the surfaces. A pull down force is generated in relation to opposite sides of the disk to provide an effective interface between the respective heads and the disk.

BRIEF DESCRIPTION OF THE DRAWINGS

The invention will be described in relation to the drawings, in which.

DETAILED DESCRIPTION OF THE PREFERRED EMBODIMENT

Figure 1:
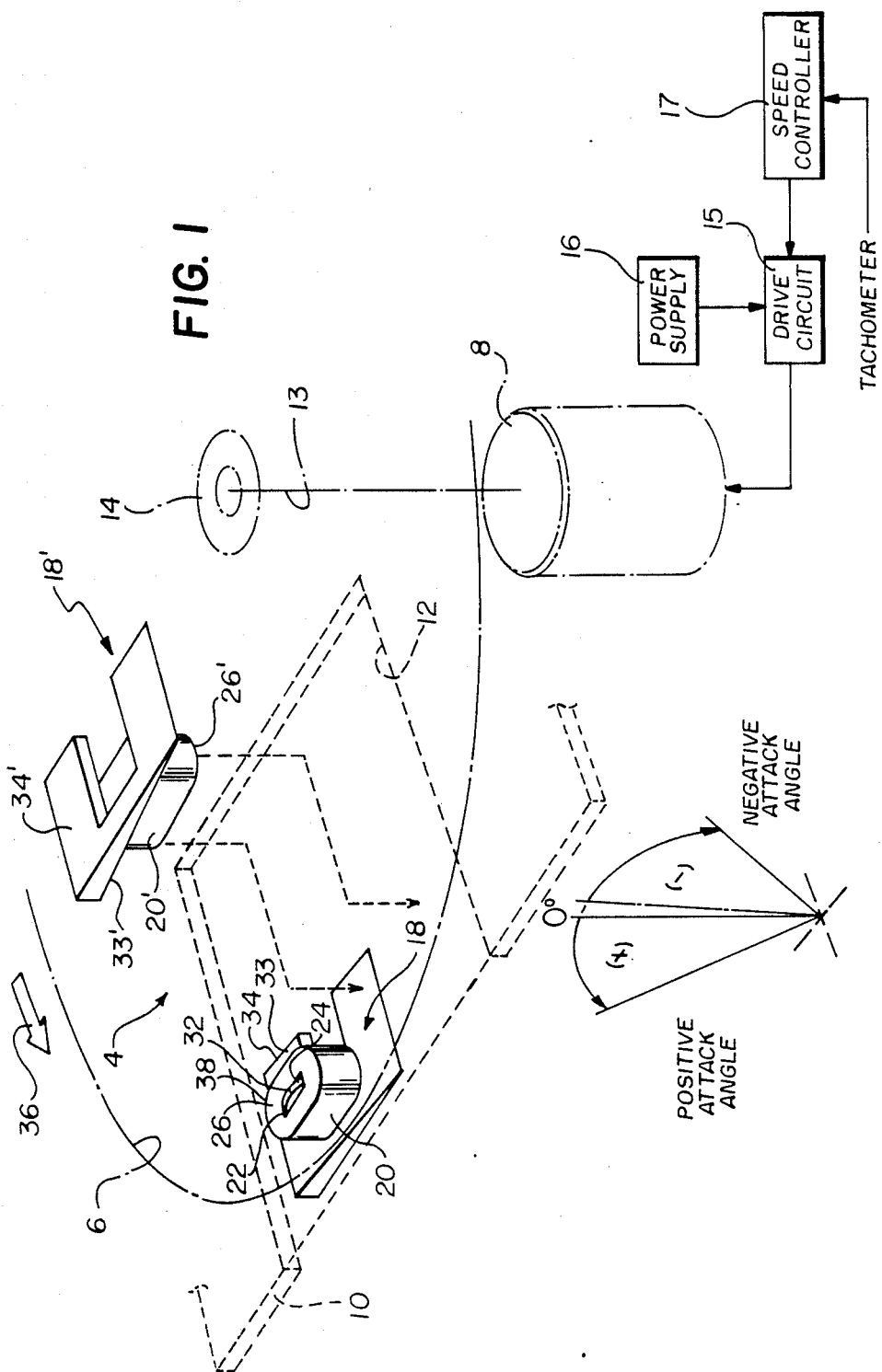
FIG. 1 is a perspective view of a double-sided recording device utilizing a pair of stabilizers that are circumferentially offset in accordance with the invention.
Figure 2:
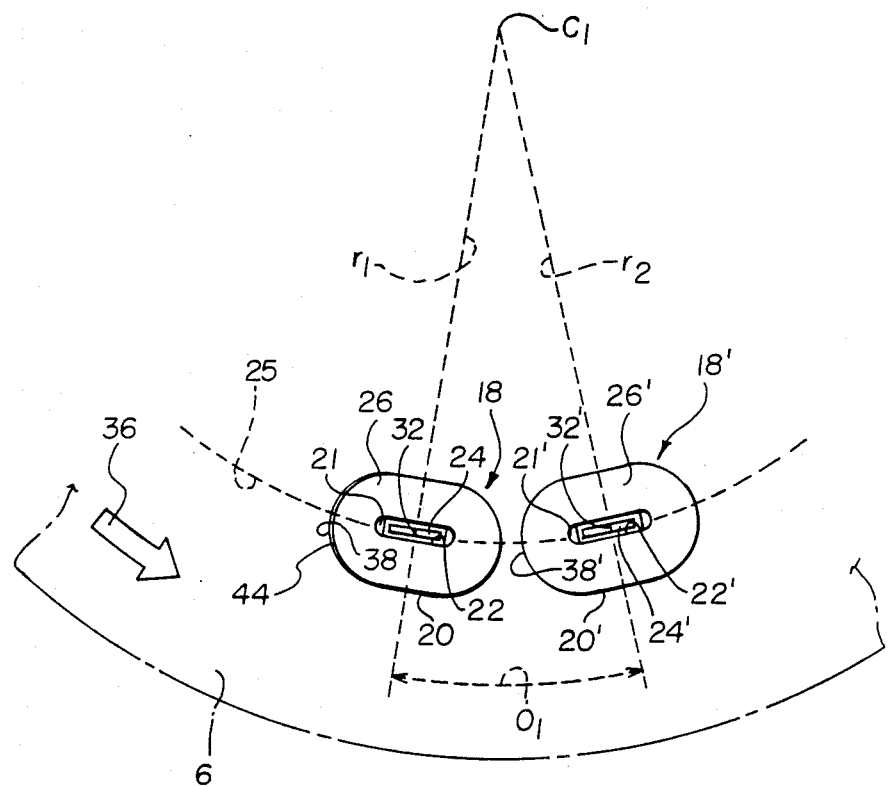
FIG. 2 is a plan view of the offset stabilizers of FIG. 1.
Figure 3:
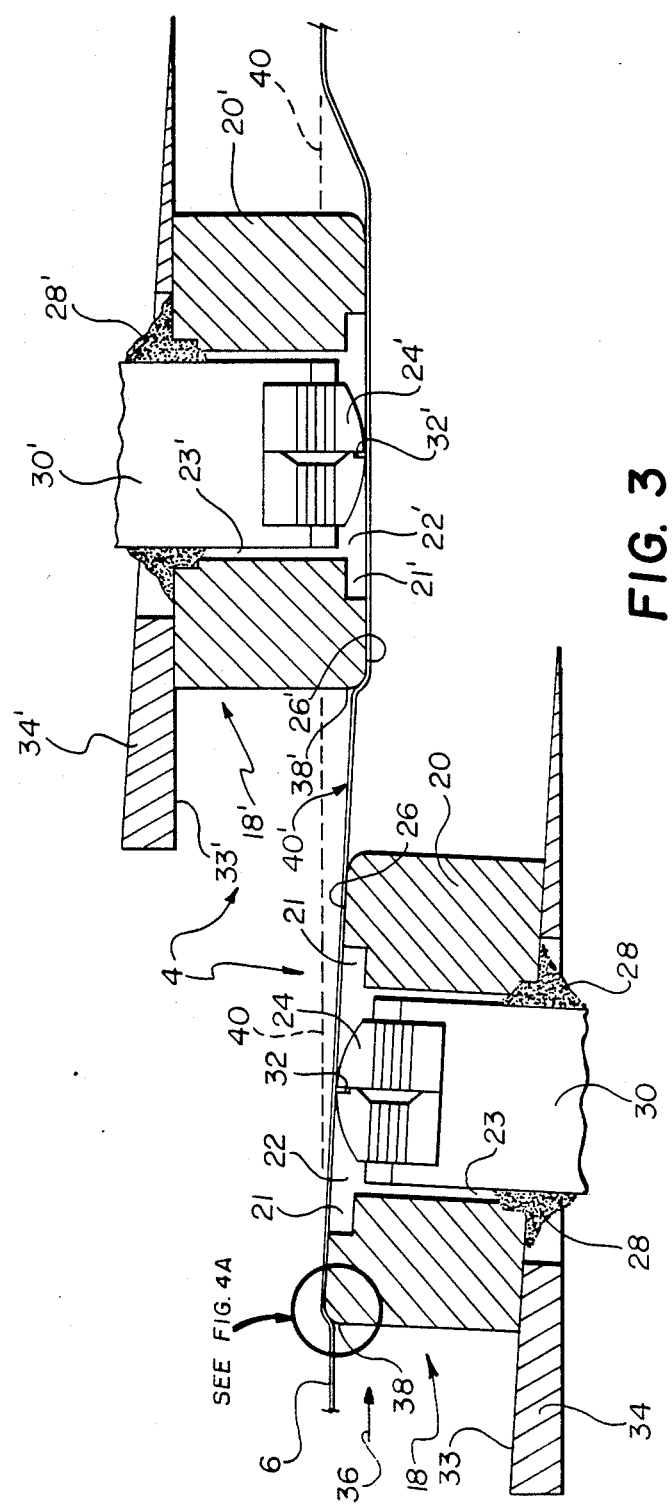
FIG. 3 is a cross-sectional view of the offset stabilizers of FIG. 1.

Details of a double-sided stabilizer device 4 are shown by FIGS. 1, 2 and 3. A magnetic disk 6 is enclosed for rotation within a jacket 10 (shown in broken-line in FIG. 1) having an opening 12 through which the stabilizer device 4 can access both sides of the disk 6. A drive motor 8 has a spindle 13 connecting to a hub 14 that is securely attached to an inside periphery of the disk 6. Current for the motor 8 is supplied by a drive circuit 15, which is connected to a power supply 16. For example, the motor 8 may be a brushless dc motor and the drive circuit 15 would provide electronic commutation of the motor. Feedback from a tachometer or like reference signal generator is provided to a speed controller circuit 17 for controlling the speed of the motor 8.

The double-sided stabilizer device 4 includes a lower stabilizer device 18 and an upper stabilizer device 18'. (Since the stabilizer devices 18 and 18' are substantially identical except for their orientation, components of the upper device 18' will be designated with a prime (').) The stabilizer device 18 (18') includes a stabilizing block 20 (20') having an opening 22 (22') for exposing a magnetic head 24 (24') to the surface of the disk 6. A circumferential, flat air bearing surface 26 (26') surrounds the opening 22 (22') on the side of the block 20 (20') that faces the disk 6. The block 20 (20') is made of a hard ceramic material having a moderate degree of surface roughness—on the order of 10 Å or greater as characterized by conventional root-mean-square measurement of surface height with a phase-shift interference microscope. The preferred material is a conductive barium titanate ($BaTiO_3$) available from Kyocera Corporation (Kyoto, Japan) as material item number T793H. Though the circumferential surface 26 (26') is shown to be oval in shape, other shapes are also believed to work in the practice of the invention. As best shown by FIG. 2, the stabilizer device is used in a system in which the heads 24 and 24' follow a circular trace 25 during recording and repeatedly follow the same trace 25 during reproduction. Each trace corresponds to a pair of tracks on opposite recording layers of the disk 6; for example, the paired tracks may correspond to a single video picture (e.g., a video field on opposite sides thereof) in a still video recording/reproduction system, or to video and audio in a still video system, or to data tracks in a data storage system.

As best shown by FIG. 3, the opening 22 (22') leads to a cavity 23 (23') in the block 20 (20'). A non-magnetic potting compound 28 (28'), such as epoxy, supports a shoe 30 (30') within the cavity 23 (23') in relation to the stabilizing block 20 (20'). The head 24 (24') is mounted on the shoe 30 (30') to locate a magnetic gap 32 (32') in relation to the opening 22 (22') so that the gap 32 (32') slightly protrudes above the plane of the air bearing surface 26 (26'). FIGS. 2 and 3 also show a step 21 (21') recessed about 0.005 inches below the air bearing surface 26 toward the edge of the opening 22 (22'). This step is believed to assist in the generation of coupling forces between the disk 6 and the head 24 (24'), as well as acting to at least somewhat reduce frictional drag and current draw on the drive motor.

Figure 6:
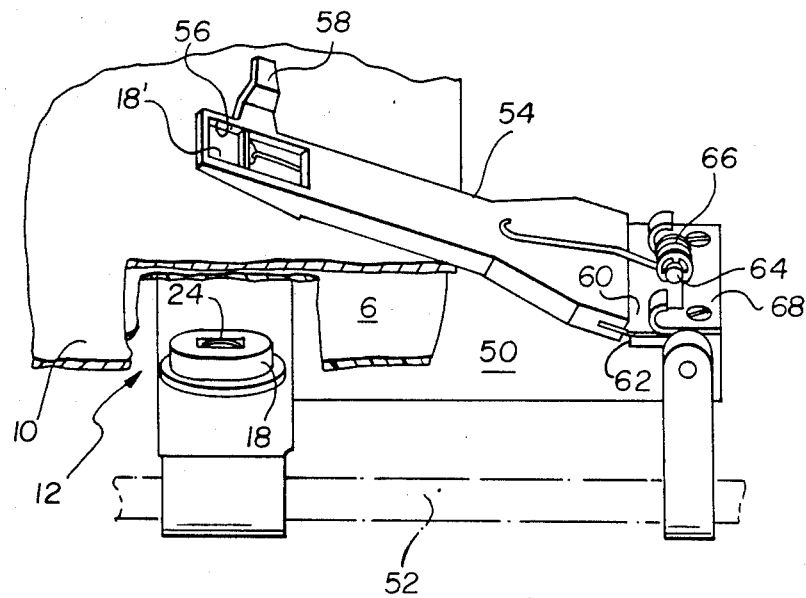
FIG. 6 is a perspective view of a suitable carriage for bringing the offset stabilizers of FIGS. 1 and 5 into contact with a magnetic disk.

The stabilizing block 20 (20') is supported with respect to the disk 6 along a flat inclined surface 33 (33') of wedge-shaped support 34 (34')— (or any other kind of like support)— mounted upon a conventional head positioning carriage (which is shown and later described in connection with FIG. 6). As shown by FIG. 1, the support 34 and thus the stabilizing block 20 are disposed at a particular angle (the attack angle) with respect to the nominal plane of the rotating disk. (The nominal plane is the plane established by the rotating disk absent any interference.) The other stabilizing block 20', which is downstream of the block 20 in relation to the moving disk 6, is disposed at an angle with respect to the plane of the disk 6 as it leaves the air bearing surface 26 of the block 20. (This is best shown by FIG. 3, wherein the air bearing surface 26' is generally parallel to the nominal plane but angled with respect to the incoming disk 6.) While the precise dimensions of the stabilizer are not critical and may vary depending upon the size of the disk, head structure, etc., the particular dimensions used in connection with a preferred dual track configuration (which will be described in connection with FIG. 6) for recording fifty circular tracks on a disk 47 mm in diameter include (referring to FIG. 6) an approximate length L of 0.328 inches and width W of 0.250 inches. Inasmuch as the opening 12 limits access to the disk 6, these dimensions may need to be adjusted for particular applications.

Figure 4A:
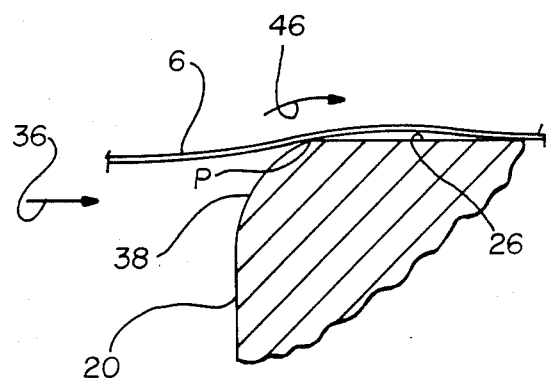
FIGS. 4A and 4B are detailed views of a leading edge portion of one of the stabilizers of FIG. 3, one figure showing the interface between the medium and the stabilizer and the other figure showing the angular configuration of the leading edge.
Figure 4B:
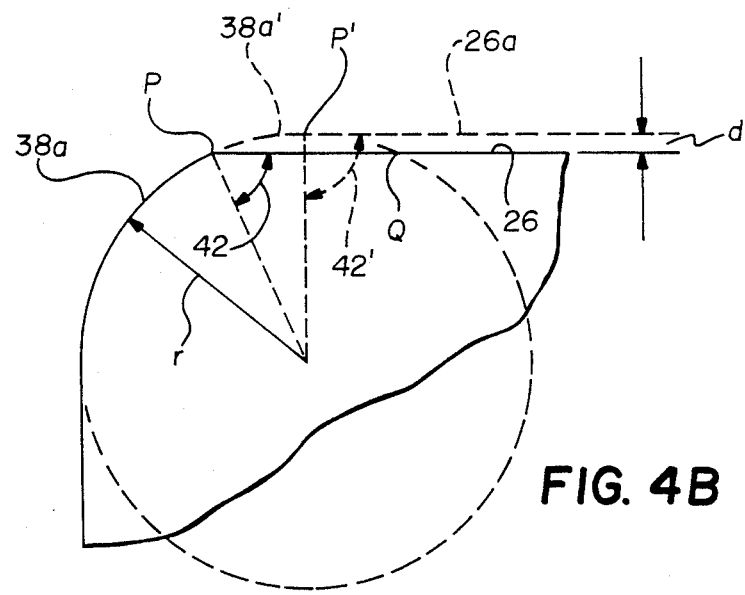

When the magnetic disk 6 is rapidly rotated by the drive motor 8 in a direction shown by an arrow 36, successive portions of the disk 6 are in substantial contact with a leading curved edge 38 (38') of the flat air bearing surface 26 (26'). (The term "substantial contact", as here used, allows for a narrow channel between the media and each stabilizer device which is believed to permit the passage of a thin film of air.) The angle of the wedge-shaped support 34 (34') relative to the disk 6, which defines the attack angle, limits penetration of the leading curved edge 38 (38') into the plane of the disk 6. The extent of penetration is generally quite small, e.g., 0.006 in. Preferably the attack angle should be as small as possible to prevent excessive wear of the transducing and/or disk surfaces. In the preferred embodiment, the air bearing surface 26 is disposed at a negative angle of attack of 2.0° in relation to the nominal plane 40 of the disk 6. The air bearing surface 26' is disposed at an 0° angle with respect to the nominal plane 40, which places it at a negative attack angle of about 2.0° in relation to a disk region 40' just downstream of the air bearing surface 26. p As shown by FIG. 4B in connection with the stablilizer device 18, a portion 38a of the leading edge 38 is defined by a radius r (r=0.012 in. according to the preferred embodiment) up to a certain point P, where the smoothly varying surface 38a abruptly meets the flat air bearing surface 26 in a non-tangential transition. The edge-tracing radius r meets the air bearing surface 26 at an included angle 42 that is acute. As further shown by broken line in FIG. 4B, if the radius r is allowed to further trace a surface to point P', the point of joining with the flat surface 26a (parallel to surface 26) would be in tangential relation, that is, the line defined by the surface 26a would be tangent to the circle described by radius r. When the leading edge 38 is subjected to an abrupt transition at the point P, it can be seen that the air bearing surface 26 coincides with a chord PQ of the circle defined by the radius r. In the preferred embodiment, the perpendicular distance d of this chord PQ from the broken line surface 26' is between 0.003 and 0.005 inches. Though not particularly set forth in the figures, the leading edge 38' of the stabilizing device 18' is configured the same as the leading edge 38 described in connection with FIG. 4B.

A stabilizer with the non-tangential transition P may be manufactured in any number of conventional ways. One way that works especially well is to manufacture a stabilizer of the type with a continuation of the blended radius leading edge 38a', as shown in FIG. 4B, leading into the surface 26a. Then the surface 26a is lapped by conventional techniques until the lapped surface coincides with the air bearing surface 26 shown in FIG. 4B. This requires removal of a thickness corresponding to the distance d, that is, between 0.003 and 0.005 inch.

As better shown by FIG. 2, the transition point P is one of many points defining a curved line 44 that first meets the surface of the disk 6 as it is rotated over the penetrating leading edge 38 of the stabilizer 18. (The same is true of the stabilizer 18, though the corresponding curved line is hidden in the plan view of FIG. 2.) This curved line 44, again shown as a point P in FIG. 4A, serves as a fulcrum about which the contacting section of the disk 6 attempts to rotate. Though the precise mechanism is not well established, it is believed that a torque force is generated according to an arrow 46 (FIG. 4A) that attempts to twist the disk 6 clockwise. This force serves to deflect the disk 6 from its nominal plane 40 firmly upon the air bearing surface 26.

As heretofore described, the two stabilizing devices 18 and 18', together with their included magnetic heads 24 (24'), are disposed on opposite sides of the magnetic disk 6 for recording and playback of signals in relation to both magnetic recording surfaces of the disk 6. The plan view of FIG. 2 shows that each stabilizing device 18 and 18' is positioned in relation to separate radii $r_1$ and $r_2$ depending from the center $c_1$ of the drive spindle. By virtue of their location on the radii $r_1$ and $r_2$, the stabilizing devices are separated by a circumferential offset $O_1$ in the direction 36 of disk rotation. The amount of offset is empirically selected to permit the air bearing surfaces 26 and 26' to separately act upon the opposed surfaces of the disk 6 with a minimum level of interaction. Clearly, no part of the air bearing surfaces 26 and 26' can be directly opposed such that they would be in contact in absence of the disk 6.

It is believed, however, that a certain level of interaction is not harmful; for example, as shown by FIG. 3, the planar orientation of the disk 6 as it exits the first air bearing surface 26 does not have to settle into the nominal plane 40 before it can be effectively "captured" by the second air bearing surface 26'. This means, referring to FIG. 3, that the second (downstream) stabilizing device 18' can be so disposed relative to the first (upstream) stabilizing device 18 that the leading edge 38' of the second air bearing surface 26' engages the disk 6 at the disk region 40' immediately downstream of the first air bearing surface 26. Since the plane of the disk 6 at the leading edge 38' is still perturbed by the pull-down force of the upstream stabilizing device 18, the second stabilizing device 18' may need to be repositioned (relative to the position shown in FIG. 3) so that the penetration of the leading edge 38' remains within acceptable limits.

The stabilizing devices 18 and 18' and their included heads 24 and 24' may be mounted in any of several conventional configurations using conventional accessing mechanisms. One example is shown in FIG. 6. A fragment of the magnetic disk 6 and its jacket 10 are shown with the opening 12 through which the dual heads 24 and 24' come in contact with the disk. The accessing mechanism includes a lower carriage 50 and a lead screw 52 (shown in broken line) or other type of radial accessing mechanism for driving the lower carriage 50 along the opening 12 to a selected radial track position. The first, or lower, stabilizing device 18 and its included head 24 are fixed to the free end of the lower carriage 50. The fixed stabilizing device 18 is positioned as shown in FIG. 3 to penetrate or intercept the nominal plane 40 of the disk 6.

A cantilevered upper carriage or load arm 54 is pivotally mounted at the end of the lower carriage 50. A small aperture 56 is provided adjacent the free end of the upper load arm 54, within which the upper stabilizing device 18' and its included head 24' are disposed facing toward the upper surface of the disk 6. Also adjacent the free end is a landing control tab 58 engageable by a solenoid operated element (not shown) to permit automatic pivoting of the load arm 54 away from the lower stabilizing device 18, as in the position shown in FIG. 6, or to release the arm 54 to permit engagement or "landing" of the stabilizing device 18' on the magnetic disk 6 as shown in FIG. 3.

The base end of the load arm 54 is coupled to the adjacent end of the carriage 50 by a light flexure spring 60 which permits pivoting movement away from the stabilizing device 18. The spring 60 engages a head load stop 62 to define the limit for movement in the direction toward the fixed stabilizing device 18. A cylindrical mandrel 64 is coupled to the carriage adjacent the pivot end of the load arm 54 to spring load the arm 54 in the direction of the fixed stabilizing device 18. A keeper 68 on the end of the mandrel 64 maintains the load spring 66 in position once mounted. A typical mechanism of this type is disclosed in U.S. Pat. No. 4,151,573. One marked difference with that patent, however, is that the movable, upper stabilizing device 18' is preferably fixed in the upper arm 54, rather than being gimbal-mounted, as shown in the patent. While gimbal mounting is not to be foreclosed, it is believed to be desirable to have the upper stabilizing device 18' fixed in relation to the nominal plane 40 of the disk 6 so that the penetration of the leading edge 38' can be tightly controlled. Another type of accessing mechanism that may be successful in this application is a "clamshell" mount in which both stabilizing devices 18 and 18' are mounted on pivotable arms that move toward and away from the magnetic disk. This type of mechanism is seen, for example, in U.S. Pat. No. 3,946,439.

Figure 5:
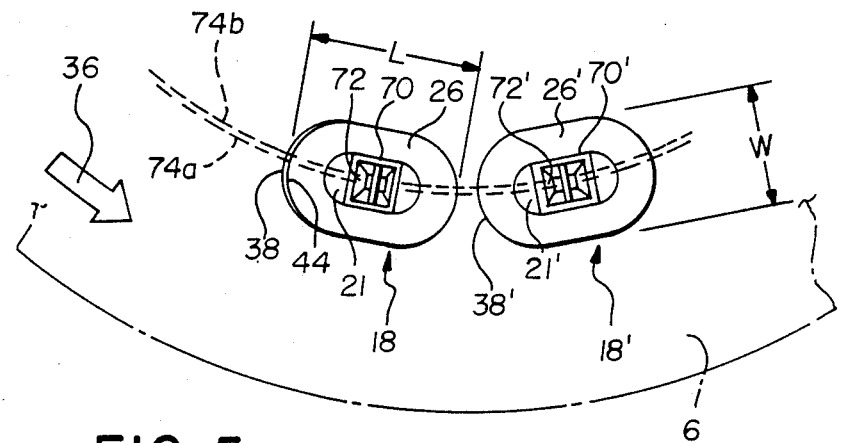
FIG. 5 is a plan view similar to FIG. 2 but of offset stabilizers that each support a dual-track thin film head.

FIG. 5 shows the preferred application of two stabilizers in combination with dual gap heads. The stabilizers have openings 70 and 70' large enough to accommodate dual gap heads 72 and 72' for generating two traces 74a and 74b on each side of the disk 6. FIG. 5 also shows a plan view of the 0.005 inch recess 21 (21') mentioned in connection with FIG. 3. Furthermore, different types of head structure may be accommodated. For example, FIG. 5 shows an opening to a negative pressure cavity sufficient to contain the dual transducing gaps of a preferred thin-film head 72 (72') rather than a wound ferrite head. In the case of a dual-gap stabilizer, it has been found that somewhat better pull-down performance is obtained by having the epoxy 28 (28') completely seal one end of the cavity 23 (23'). Conversely, such a complete seal is unnecessary for a single-gap stabilizer; indeed, vents are provided through the epoxy 28 (28') if it should happen to seal the cavity 23 (23'). It may prove advantageous to offset the stabilizing devices 18 and 18' slightly in a radial direction so that there is a slight radial offset in the head gaps 32 (32') to prevent flux interaction. With the single (or dual) tracks consequently offset from one side to the other in the radial direction, there may be greater immunity to crosstalk.

The invention has been described in detail with particular reference to a preferred embodiment thereof, but it will be understood that further variations and modifications can be effected within the spirit and scope of the invention.

What is claimed is:

1. Apparatus for accessing both sides of a flexible storage medium rotating about an axis, said apparatus comprising:
   first and second carriage members;
   means commonly supporting said carriage members for radial movement relative to said axis;
   a pair of transducers each supported by a respective carriage member, said transducers being disposed on opposite sides of the medium in relation to separate radii thereof such that a circumferential offset is maintained between said transducers;
   stabilizing means surrounding said respective transducers for interacting with the disk and for generating respective pull down forces on successive portions of the rotated medium as each portion is rotated adjacent said stabilizing means; and
   means acting upon at least one of said carriage members for relatively urging said transducers toward each other to cause each transducer to separately interact with the medium.

2. Apparatus as claimed in claim 1 in which said first carriage member maintains one of said transducers in fixed relation to the medium and said second carriage member supports said other transducer for movement toward and away from the medium.

3. Apparatus as claimed in claim 1 in which said transducers are radially offset in relation to the axis of rotation.

4. Apparatus as claimed in claim 1 in which said stabilizing means deflect the storage medium so as to penetrate the nominal plane of the storage medium from opposite sides thereof.

5. Apparatus as claimed in claim 4 in which said circumferential offset is of such magnitude that no part of said stabilizing means surrounding one transducer is directly opposite any part of said stabilizing means of the other transducer.

6. Apparatus for processing information relative to both sides of a flexible magnetic disk rotating about an axis, said apparatus comprising:
   a pair of transducer heads;
   a pair of stabilizing members each having a substantially flat air bearing surface for stabilizing the flexible disk as it is rotated over said surface;
   means, integral with each air bearing surface, defining a negative pressure cavity having an opening to said surface for generating a pull down force on successive portions of the rotated disk as each portion is moved over said opening;
   means supporting a respective head in said cavity of a respective stabilizing member; and
   carriage means for respectively supporting said stabilizing members and said respective heads therewith for common radial movement relative to said axis, said carriage means disposing said stabilizing members on opposite sides of the disk in relation to separate radii thereof such that a circumferential offset is maintained between said air bearing surfaces and a pull down force is generated in relation to opposite sides of the disk along said surfaces to provide an effective interface between the respective transducer heads and the disk.

7. Apparatus as claimed in claim 6 wherein said carriage means orients each air bearing surface at a negative attack angle with respect to the plane of the rotating disk at its point of encounter with each surface.

8. Apparatus as claimed in claim 6 in which said stabilizing members are radially offset in relation to the axis of rotation in order to minimize flux interaction between said transducer heads.

9. Apparatus as claimed in claim 6 in which said carriage means disposes said stabilizing members in spaced relation on opposite sides of the disk such that no part of said air bearing surfaces are directly opposed.

10. The apparatus of claim 6 wherein said carriage means orients the air bearing surface downstream of the other surface generally parrallel to the nominal plane of the rotating disk and at a negative attack angle relative to the perturbed surface of the disk as it exits the upstream air bearing surface.

11. Apparatus as claimed in claim 6 in which at least one of said transducer heads has a plurality of transducing gaps for simultaneously interfacing with the disk.

12. Apparatus for recording data on data tracks on both sides of a flexible magnetic disk rotating about an axis, said apparatus comprising:
   first and second carriage members;
   means commonly supporting said carriage members for simultaneous movement laterally of said data tracks;
   a pair of transducer heads each surrounded by a stabilizer, a first of said heads being supported by said first carriage member and a second of said heads being supported by said second carriage member, said heads being disposed on opposite sides of the disk in relation to separate radii thereof such that a circumferential offset is obtained when said heads are in a recording position on the disk;
   means defining a negative pressure cavity in each stabilizer for generating a pull down force on successive portions of the rotated medium as each portion is rotated over said cavity defining means; and
   means acting upon at least one of said carriage members for relatively urging said heads toward the recording position with a force of sufficient magnitude to cause said stabilizers to deflect the disk from its nominal plane whereby the disk is forced to conform to the separated surfaces of said stabilizers.

13. The apparatus of claim 12 wherein each stabilizer has a circumferential flat air bearing surface surrounding said cavity defining means and wherein the surface of each stabilizer is angled with respect to the other when said heads are in the recording position.

14. Apparatus as claimed in claim 1 in which said stabilizing means for generating respective pull down forces comprises respective negative pressure cavities, and wherein a respective transducer is supported within a respective cavity.

15. Apparatus for processing information relative to both sides of a flexible magnetic disk rotating about an axis, said apparatus comprising:
   a pair of transducer heads;

a pair of stabilizing members each having a substantially flat air bearing surface for stabilizing the flexible disk as it is rotated over said surface;

means, integral with each air bearing surface, defining a negative pressure cavity having an opening to said surface for generating a pull down force on successive portions of the rotated disk as each portion is moved over said opening;

means supporting a respective head in said cavity of a respective stabilizing member; and means for disposing said stabilizing members on opposite sides of the disk in relation to separate radii thereof such that a circumferential offset is maintained between said air bearing surfaces and a pull down force is generated in relation to opposite sides of the disk along said surfaces to provide an effective interface between the respective transducer heads and the disk, said disposing means further orienting the air bearing surface downstream of the other surface generally parallel to the nominal plane of the rotating disk and at a negative attack angle relative to the perturbed surface of the disk as it exits the upstream air bearing surface.

16. Apparatus for recording data on data tracks on both sides of a flexible magnetic disk rotating about an axis, said apparatus comprising:

first and second carriage members;

means commonly supporting said carriage members for simultaneous movement laterally of said data tracks;

a pair of transducer heads each surrounded by a stabilizer having a circumferential flat air bearing surface, a first of said heads being supported by said first carriage member and a second of said being supported by said heads second carriage member, said heads being disposed on opposite sides of the disk in relation to separate radii thereof such that a circumferential offset is obtained when said heads are in a recording position on the disk and wherein said air bearing surface of each stabilizer is angled with respect to the other when said heads are in the recording position; and means acting upon at least one of said carriage members for relatively urging said heads toward the recording position with a force of sufficient magnitude to cause said stabilizers to deflect the disk from its nominal plane whereby the disk is forced to conform to the separated surfaces of said stabilizers.

* * * * *

UNITED STATES PATENT AND TRADEMARK OFFICE
CERTIFICATE OF CORRECTION

PATENT NO. : 4,928,196
DATED : May 22, 1990
INVENTOR(S) : William K. Hickok et al It is certified that error appears in the above-identified patent and that said Letters Patent is hereby corrected as shown below:

Column 10, line 11, insert --heads-- after the word "said".

Column 10, line 12, delete the word "heads".

Signed and Sealed this

Thirtieth Day of July, 1991

Attest:

HARRY F. MANBECK, JR.

*Attesting Officer*   *Commissioner of Patents and Trademarks*